(12) United States Patent
Demick et al.

(10) Patent No.: US 6,929,302 B1
(45) Date of Patent: Aug. 16, 2005

(54) PULL-OUT EXTENDER FOR PASSENGER VEHICLE

(76) Inventors: Kenneth N. Demick, 705 Western St., Alturas, CA (US) 96101; Jenave J. Demick, 705 Western St., Alturas, CA (US) 96101

( * ) Notice: Subject to any disclaimer, the term of this patent is extended or adjusted under 35 U.S.C. 154(b) by 0 days.

(21) Appl. No.: 10/940,487

(22) Filed: Sep. 15, 2004

(51) Int. Cl.$^7$ ............................................. B60P 3/39
(52) U.S. Cl. ........................... 296/26.01; 296/26.09; 296/170
(58) Field of Search .................. 296/26.01, 26.08, 296/26.09, 169, 170, 39.1, 39.2, 37.6, 37.1; 414/522; 224/281

(56) References Cited

U.S. PATENT DOCUMENTS

| | | | |
|---|---|---|---|
| 2,470,314 A * | 5/1949 | Lim | 296/26.1 |
| 2,545,269 A * | 3/1951 | Ford | 312/334.13 |
| 4,455,948 A | 6/1984 | Torres | |
| 4,830,242 A * | 5/1989 | Painter | 224/42.32 |
| 4,900,217 A * | 2/1990 | Nelson | 414/537 |
| 4,993,088 A | 2/1991 | Chudik | |
| 5,154,470 A | 10/1992 | Bringman, Jr. | |
| 5,267,748 A | 12/1993 | Curran | |
| 5,397,147 A | 3/1995 | Ducharme et al. | |
| 5,533,771 A | 7/1996 | Taylor et al. | |
| 5,575,521 A | 11/1996 | Speis | |
| 5,649,731 A * | 7/1997 | Tognetti | 296/26.09 |
| 5,816,638 A | 10/1998 | Pool, III | |
| 5,820,190 A | 10/1998 | Benner | |
| 5,899,518 A * | 5/1999 | Schreiner | 296/26.01 |
| 6,059,339 A * | 5/2000 | Madson | 296/26.01 |
| 6,318,781 B1 * | 11/2001 | Mc Kee | 296/26.09 |
| 6,464,274 B2 * | 10/2002 | Mink et al. | 296/28.09 |
| 6,554,340 B1 | 4/2003 | Stevenson | |
| 6,609,743 B1 | 8/2003 | Stevenson | |
| 6,758,508 B2 * | 7/2004 | Weyhrich | 296/26.09 |
| 6,808,217 B2 * | 10/2004 | Nick et al. | 296/26.08 |

* cited by examiner

Primary Examiner—D. Glenn Dayoan
Assistant Examiner—Greg Blankenship
(74) Attorney, Agent, or Firm—Donald R. Schoonover

(57) ABSTRACT

A pull-out extender includes a container that is attachable to a passenger vehicle. A foldable table-like unit is stored in the container and includes rollers which are accommodated in grooves defined in the container. Foldable and telescoping legs are attached to the table-like elements and a tent-like cover can also be attached to the vehicle above the container to cover the table-like elements when such elements are deployed. Grommets are included on the table-like elements for accommodating umbrellas.

2 Claims, 1 Drawing Sheet

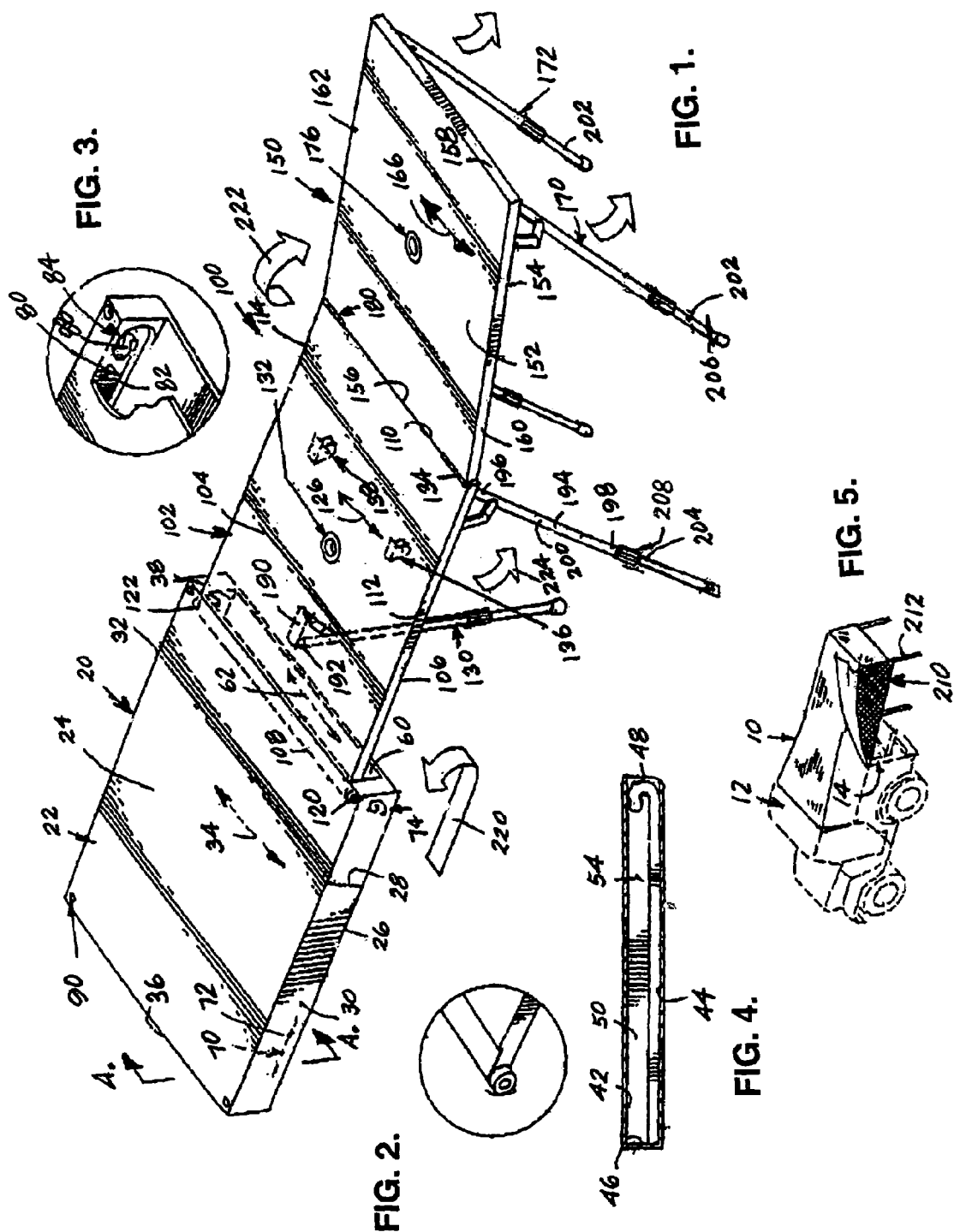

PULL-OUT EXTENDER FOR PASSENGER VEHICLE

BACKGROUND OF THE INVENTION

1. Field of the Invention

The present invention relates to the general art of motor vehicles, and to the particular field of accessories for motor vehicles.

2. Description of the Related Art

Automobiles are used for a wide variety of purposes today. No longer is an automobile simply a means for traveling from one point to another. Today, automobiles can be entertainment centers with DVD players, elaborate stereo systems, video game terminals, and the like. Accordingly, the art contains many examples of accessories that are used in connection with an automobile.

Often, people even use their automobile as a centerpiece in a camping expedition. In such a case, the automobile may be a part of a table, or even a part of sleeping arrangements.

Still further, to be most successful, such an accessory should be as versatile as possible. That is, the accessory should have a plurality of uses, rather than a single use, such as merely a table, or the like.

Therefore, there is a need for an accessory for use on an automobile that can be used for a plurality of uses, including, but not limited to, as a table or as a bed, or the like.

While the truck art contains examples of bed extenders, the inventor is not aware of any device that can be easily stored in a passenger vehicle that can be converted into an extended horizontal surface for use as a work surface or as a bed or as a table, or the like.

Therefore, there is a need for an accessory for use on a passenger vehicle that can be converted into an extended horizontal surface for use as a work surface or as a bed or as a table, or the like.

To be most successful, such an accessory should be adapted for easy retrofit onto an existing vehicle whereby the accessory can be used on existing vehicles as well as factory produced vehicles. Retrofitting should be easy and inexpensive to encourage maximum use of the accessory.

Therefore, there is a need for an accessory for use on a passenger vehicle that is easily retrofit onto the vehicle and which can be converted into an extended horizontal surface for a plurality of uses, including, but not limited to, use as a work surface or as a bed or as a table, or the like.

PRINCIPAL OBJECTS OF THE INVENTION

It is a main object of the present invention to provide an accessory for use on an automobile that can be used as a table or as a bed, or the like.

It is another object of the present invention to provide an accessory for use on a passenger vehicle that can be converted into an extended horizontal surface for use as a work surface or as a bed or as a table, or the like.

It is another object of the present invention to provide an accessory for use on a passenger vehicle that is easily retrofit onto the vehicle and which can be converted into an extended horizontal surface for use as a work surface or as a bed or as a table, or the like.

SUMMARY OF THE INVENTION

These, and other, objects are achieved by a pull-out extender that is stored in a container that is easily attached to a vehicle and which includes two table top-like elements that are hingeably connected together and which include foldable, telescoping legs. The table top-like elements are mounted on rollers that are accommodated in grooves defined in the container. Umbrella support grommets are located on the table top-like elements and a tent-like covering is also included for attachment to the vehicle above the pull-out extender.

Using the pull-out extender embodying the present invention will permit a passenger vehicle to include a horizontal surface that can be used as a work surface, a sleeping surface or a picnic table. The device is easily stored and deployed and is easily retrofit to an existing vehicle.

BRIEF DESCRIPTION OF THE DRAWING FIGURES

FIG. 1 is a perspective view of a pull-out extender embodying the present invention.

FIG. 2 is a detail of a section of the pull-out extender shown in FIG. 1.

FIG. 3 is a detail of a container included in the pull-out extender embodying the present invention.

FIG. 4 is a cross sectional view taken along line 5—5 of FIG. 1.

FIG. 5 shows a motor vehicle having a cover for use in conjunction with the pull-out extender shown in FIG. 1.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a pull-out extender system 10 that achieves the above-stated objects and overcomes the above-discussed drawbacks. System 10 comprises a passenger land vehicle 12, such as an off-road type vehicle or the like, having a rear end 14.

A container or housing unit 20 is mounted in the land vehicle 12 adjacent to rear end 14 when in use and includes a hollow housing 22 having a first surface-defining section 24, which defines a top surface when container unit 20 is in use, and a second surface-defining section 26, which defines a bottom surface when container unit 20 is in use. A thickness dimension 28 extends between first surface-defining section 24 and second surface-defining section 26. Housing unit 20 further includes a first side wall 30, a second side wall 32, and a width dimension 34 which extends between first side wall 30 and second side wall 32. Housing unit 20 further includes a first end wall 36 which is a rear end wall when container unit 20 is in use. The side walls 30, 32 and the rear end wall 36 connect first surface-defining section 24 to second surface-defining section 26. A second end wall 38 is a front end wall when container unit 20 is in use. An inside surface, such as inside surfaces 42–50 is located on each of the side walls 30 and 32 and on each of the surface-defining sections 24 and 26 and on rear end wall 36 and on front wall 38. An interior volume 54 is defined between the inside surfaces and the walls and the surface-defining sections. An opening 60 is defined through front end wall 38 and has a width dimension 62 that extends in the direction of width dimension 34 of container unit 20 and is smaller than the width dimension 34 of container unit 20.

A first groove 70 is defined on the inside surface of first side wall 30. First groove 70 includes a linear portion 72, which extends from adjacent to the inside surface of rear end wall 36 toward front end wall 38, and an arcuate section 74 located adjacent to front end wall 38. The first groove 70 is located adjacent to the inside surface of second surface-defining section 26.

A second groove 80 is defined on the inside surface of second side wall 32. Second groove 80 includes a linear portion 82, which extends from adjacent to the inside surface of rear end wall 36 toward front end wall 38, and an arcuate section 84, that is identical to arcuate section 74 and is located adjacent to front end wall 38. Second groove 80 is located adjacent to the inside surface of second surface-defining section 26.

The arcuate sections 74, 84 of the first and second grooves 70, 80 are identical and are convex with respect to opening 60 defined through front end wall 38 to curve from the linear portion 72, 82 of each groove 70, 80 toward the front end wall 38 then toward the first surface-defining section and then toward the rear end wall 36. Each arcuate section 74, 84 of the grooves 70, 80 further includes a linear section, such as linear section 88 of arcuate section 84, that is located adjacent to the inside surface of first surface-defining section 24 and extends toward front end wall 38.

Two fastener-accommodating holes, such as hole 90, are defined through first surface-defining section 24 and are used to attach unit 20 to vehicle 12. Additional fastener-accommodating holes can be included if suitable as indicated in FIG. 1.

A support surface unit 100 includes a first support surface element 102, which has a first surface-defining section 104 that defines a top surface when support surface unit 100 is in a use condition as shown in FIG. 1, a second surface-defining section 106, which defines a bottom surface when support surface unit 100 is in the use condition, a first end 108 which is a rear end when support surface unit 100 is in the use condition, and a second end 110 which is a front end when support surface unit 100 is in the use condition. First end 108 of the first support surface element 102 is located adjacent to front end wall 38 of container unit 20 when support surface unit 100 is in the use condition and second end 110 of first surface support surface element 102 is located adjacent to front end wall 38 of container unit 20 when support surface unit 100 is in a stored condition.

A first side wall 112 connects first surface-defining section 104 of the first support surface element 102 to second surface-defining section 106 of the first support surface element 102 and is located adjacent to the inside surface of first side wall 30 of container unit 20. A second side wall 114 connects first surface-defining section 104 of the first support surface element 102 to second surface-defining section 106 of the first support surface element 102 and is located adjacent to the inside surface of second side wall 32 of container unit 20.

A first roller element 120 is mounted on first side wall 112 of the first support surface element 102 adjacent to rear end 108 of the first support surface element 102. First roller element 120 is sized to be rollably received in groove 70. A second roller element 122 is mounted on second side wall 114 of the first support surface element 102 adjacent to rear end 108. Second roller element 122 is sized to be rollably received in groove 80. The roller elements 120, 122 are located in the linear sections 72, 82 of the grooves 70, 80 when the first support surface element 102 is in the stored condition and are located in the linear section 88 of the arcuate sections 74, 84 of the grooves 70, 80 when the first support surface element 102 is in the use condition.

First support surface element 102 has a width dimension 126 which extends between first side wall 112 and second side wall 114. Width dimension 126 of the first support surface element 102 is smaller than width dimension 62 of opening 60 defined through the front end wall 38 of container unit 20 so support surface unit 100 can slide through the opening 60 as will be understood by those skilled in the art based on the teaching of the present disclosure.

Three support leg elements, such as leg element 130, are connected to second surface-defining section 106. An umbrella-accommodating hole 132 is defined through the first support surface element 102.

A hinge unit 134 is located on second end wall 110 of the first support surface element 102, and wheel units 136 and 138 are mounted on second surface-defining section 106 to assist in moving unit 100 as will be understood from the teaching of the present disclosure. The grooves 70, 80 and rollers 120, 122 are sized and located so the leg elements 130 will not interfere with movement of unit 100.

A second support surface element 150 has a first surface-defining section 152 that is a top surface when support surface unit 100 is in the use condition, a second surface-defining section 154 which is a bottom surface when support surface unit 100 is in the use condition, a first end 156 which is a rear end when support surface unit 100 is in the use condition, and a second end 158 which is a front end when support surface unit 100 is in the use condition. First end 156 is located adjacent to second end 110 of the first support surface element 102 and second end 158 of the second support surface element 150 is spaced apart from second end 110 of the first support surface element 102. First end 156 of the second support surface element 150 is located adjacent to front end wall 38 of container unit 20 when second support surface unit 100 is in the stored condition and second end 158 of second support surface element 150 is located adjacent to the inside surface of rear end wall 36 of container unit 20 when second support surface 150 is in the stored condition inside container unit 20. First surface-defining section 152 of the second support surface element 150 is in abutting contact with first surface-defining section 104 of the first support surface element 102 when support surface unit 100 is in the stored condition.

A first side wall 160 connects first surface-defining section 152 of the second support surface element 150 to second surface-defining section 154 of the second support surface element 150 and is located adjacent to the inside surface of first side wall 30 of container unit 20 when unit 100 is in the stored condition, a second side wall 162 connects first surface-defining section 152 of the second support surface element 150 to second surface-defining section 154 of the second support surface element 150 and is located adjacent to the inside surface of second side wall 32 of container unit 20 when unit 100 is in the stored condition.

Second support surface element 150 has a width dimension 166 which extends between first side wall 160 and second side wall 162. Width dimension 166 of the second support surface element 150 is equal to width dimension 126 of the first support surface element 102.

Two support leg elements, 170 and 172, are connected to second surface-defining section 154 of the second support surface element 150. Leg elements 170 and 172 are identical to each other and to the leg elements 130 on the first support surface element 102. An umbrella-accommodating hole 176 is defined through the second support surface element 150. Umbrella-accommodating hole 176 is congruent with umbrella-accommodating hole 132 in the first support surface element 102 when support surface unit 100 is in the stored condition.

A hinge unit 180 is located on first end wall 156 of second support surface element 150. Hinge unit 180 on the second support surface element 150 is hingeably connected to hinge unit 134 on first support surface element 102. As indicated by the arrows in FIG. 1, second support surface element 150 moves between a stored condition, which is congruent with first support surface element 102, and a use condition, which is co-planar with the first support surface element 102.

Each support leg element includes a mounting bracket 190 fixed to the second surface-defining section of an associated support element of the first and second support elements, a hinge element 192 mounted on the mounting bracket 190, a first hollow section 194 having proximal end 196 pivotally attached to the hinge element 192 on the mounting bracket 190 associated therewith, a distal end 198 spaced apart from the proximal end 96, and a bore 200 defined between the proximal end 196 and the distal end 198. Each support leg element further includes a second section 202 telescopingly received in the bore 200 of the first section. The second section 202 of each support leg has a proximal end 204 slidably attached to the first section of the support leg element, a distal end 206, and a lock element 208 associated with the first and second sections of each support leg element. Each support leg element is pivotally movable between a stored position located adjacent to the second surface-defining section of the associated support element and a deployed position extending away from the associated support surface element.

System 10 further includes a cover unit 210 mounted on passenger land vehicle 12 superadjacent to container unit 20 when container unit 20 is mounted in the land vehicle 12. Cover unit 210 includes a plurality of legs, such as leg 212, which are movable between a stored condition and a deployed condition, with the deployed condition being shown in FIG. 5 in solid lines, and which rest on a supporting surface, such as the ground, in the deployed condition. Cover unit 210 covers unit 10 so unit 10 can be used as a sleeping area or the like.

Use of system 10 will be understood from the teaching of the foregoing disclosure and thus will not be presented in detail. However, system 10 is stored in container 20 and is pulled out as indicated by arrow 220 in FIG. 1 for use. Once unit 100 is fully out of container 20, the second support surface element 150 is rotated off the first support surface element 102 as indicated by arrow 222. The support legs are then deployed as indicated by arrow 224. Movement of rollers 120 and 122 in grooves 70 and 80 assist in the movement indicated by arrow 220 and hinge units 134 and 180 assist in the movement indicated by arrow 222, while the pivotal connection of each support leg to the associated support surface element assists in the movement indicated by arrow 224. Replacement of system 10 into a stored condition reverses the just-described process. If desired, cover unit 210 can be deployed as shown in FIG. 5.

It is understood that while certain forms of the present invention have been illustrated and described herein, it is not to be limited to the specific forms or arrangements of parts described and shown.

What is claimed is:

1. A pull-out extender system comprising:
   (a) a passenger land vehicle having a rear end;
   (b) a container unit which is mounted in the land vehicle adjacent to the rear end when in use and which includes a hollow housing having a first surface-defining section which defines a top surface when said container unit is in use, a second surface-defining section which defines a bottom surface when said container unit is in use, a thickness dimension which extends between the first surface-defining section and the second surface-defining section, a first side wall, a second side wall, a width dimension which extends between the first side wall and the second side wall, a first end wall which is a rear end wall when said container unit is in use, the side walls and the rear end wall connecting the first surface-defining section to the second surface-defining section, a second end wall which is a front end wall when said container unit is in use, an inside surface on each of the side walls and on each of the surface-defining sections, an inside surface on the rear end wall, an inside surface on the front wall, an interior volume defined between the inside surfaces and the walls and the surface-defining sections, an opening defined through the front end wall, the opening having a width dimension that extends in the direction of the width dimension of said container unit and which is smaller than the width dimension of said container unit, a first groove defined on the inside surface of the first side wall, the first groove including a linear portion which extends from adjacent to the inside surface of the rear end wall toward the front end wall and an arcuate section located adjacent to the front end wall, the first groove being located adjacent to the inside surface of the second surface-defining section, a second groove defined on the inside surface of the second side wall, the second groove including a linear portion which extends from adjacent to the inside surface of the rear end wall toward the front end wall and an arcuate section located adjacent to the front end wall, the second groove being located adjacent to the inside surface of the second surface-defining section, the arcuate sections of the first and second grooves being convex with respect to the opening defined through the front end wall to curve from the linear portion of each groove toward the front end wall then toward the first surface-defining section and then toward the rear end wall, each arcuate section of the grooves further including a linear section that is located adjacent to the inside surface of the first surface-defining section and which extends toward the front end wall, and two fastener-accommodating holes defined through the first surface-defining section;
   (c) a support surface unit which includes
      (1) a first support surface element which has a first surface-defining section that defines a top surface when said support surface unit is in a use condition, a second surface-defining section which defines a bottom surface when said support surface unit is in the use condition, a first end which is a rear end when said support surface unit is in the use condition, a second end which is a front end when said support surface unit is in the use condition, the first end of the first support surface element being located adjacent to the front end wall of said container unit when said support surface unit is in the use condition and the second end of the first support surface element being located adjacent to the front end wall of the container unit when said support surface unit is in a stored condition, a first side wall which connects the first surface-defining section of the first support surface element to the second surface-defining section of the first support surface element and which is located adjacent to the inside surface of the first side wall of said container unit, a second side wall which connects the first surface-defining section of the first support surface element to the second surface-defining section of the first support surface element and which is located adjacent to the inside surface of the second side wall of said container unit, a first roller element mounted on the first side wall of the first support surface element adjacent to the rear end of the first support surface element, the first roller element being sized to be rollably received in the groove defined on the inside surface of the first side wall, a second roller element mounted on the second side wall of the first element adjacent to the rear end of the first element, the second roller element being sized to be rollably received in the groove defined on the inside surface of the second side wall, the roller elements being located in the linear sections of the grooves when the first support surface element is in the stored condition and being located in the linear section of the arcuate sections of the grooves when the first support element is in the use condition, the first support surface element having a width dimension which extends between the first side wall of the first support surface element and the second side wall of the first support surface element, the width dimension of the first support surface element being smaller than the width dimension of the opening defined through the front end wall of said container unit, three support leg elements connected to the second surface-defining section of the first support surface element, an umbrella-accommodating hole defined through the first support surface element, a hinge unit located on the second end wall of the first support surface element, and wheel units mounted on second surface-defining section, (2) a second support surface element which has a first surface-defining section that is a top surface when said support surface unit is in the use condition, a second surface-defining section which is a bottom surface when said support surface unit is in the use condition, a first end which is a rear end when said support surface unit is in the use condition, a second end which is a front end when said support surface unit is in the use condition, the first end of the second support surface element being located adjacent to the second end of the first support element and the second end of the second support surface element being spaced apart from the second end of the first support surface element, the first end of the second support surface element being located adjacent to the front end wall of said container unit when the second support surface unit is in the stored condition and the second end of the second support surface element being located adjacent to the inside surface of the rear end wall of said container unit when the second support surface is in the stored condition, the first surface-defining section of the second support surface element being in abutting contact with the first surface-defining section of the first support surface element when said support surface unit is in the stored condition, a first side wall which connects the first surface-defining section of the second support surface element to the second surface-defining section of the second support surface element and which is located adjacent to the inside surface of the first side wall of said container unit when said support surface unit is in the stored condition, a second side wall which connects the first surface-defining section of the second support surface element to the second surface-defining section of the second support surface element and which is located adjacent to the inside surface of the second side wall of said container unit when said support surface unit is in the stored condition, the second support surface element having a width dimension which extends between the first side wall of the second support surface element and the second side wall of the second support surface element, the width dimension of the second support surface element being equal to the width dimension of the first support surface element, two support leg elements connected to the second surface-defining section of the second support surface element, an umbrella-accommodating hole defined through the second support surface element, the umbrella-accommodating hole in the second support surface element being congruent with the umbrella-accommodating hole in the first support surface element when said support surface unit is in the stored condition, and a hinge unit located on the first end wall of the second support surface element, the hinge unit on the second support surface element being hingeably connected to the hinge unit on the first support surface element, the second support surface element moving between a stored condition which is congruent with the first support surface element and a use condition which is co-planar with the first support surface element, and (3) each support leg element including a mounting bracket fixed to the second surface-defining section of an associated support element of the first and second support elements, a hinge element mounted on the mounting bracket, a first hollow section having proximal end pivotally attached to the hinge element on the mounting bracket associated therewith, a distal end spaced apart from the proximal end and a bore defined between the proximal end and the distal end, a second section telescopingly received in the bore of the first section, the second section having a proximal end slidably attached to the first section of the support leg element, a distal end, and a lock element associated with the first and second sections of each support leg element, each support leg element being pivotally movable between a stored position located adjacent to the second surface defining section of the associated support element and a deployed position extending away from the associated support surface element.

2. The pull-out extender system as described in claim 1 further including a cover unit mounted on said passenger land vehicle superadjacent to said container unit when said container unit is mounted in the land vehicle, said cover unit including a plurality of legs which are movable between a stored condition and a deployed condition and which rest on a supporting surface in the deployed condition.

* * * * *